United States Patent [19]

Kamiya et al.

[11] Patent Number: 4,871,596
[45] Date of Patent: Oct. 3, 1989

[54] ARTIFICIAL MARBLE

[75] Inventors: Takashi Kamiya; Masaya Suzuki; Yoshinori Obata, all of Nagoya; Masaaki Watanabe, Inazawa; Isao Matsuoka, Nagoya, all of Japan

[73] Assignee: Aica Kogyo Co., Ltd., Nagoya, Japan

[21] Appl. No.: 130,184

[22] Filed: Dec. 8, 1987

[30] Foreign Application Priority Data

Dec. 11, 1986 [JP] Japan ................................ 61-295403
Dec. 11, 1986 [JP] Japan ................................ 61-191025
Feb. 24, 1987 [JP] Japan ................................ 62-41100

[51] Int. Cl.⁴ .......................... A01N 1/00; B32B 15/00
[52] U.S. Cl. ........................................ 428/15; 428/211;
428/195; 428/284; 428/286; 428/524; 428/527;
428/285; 428/287; 428/329; 428/331; 428/368;
428/408; 428/525
[58] Field of Search ................ 428/15, 195, 211, 284,
428/286, 524, 527, 285, 287, 329, 331, 368, 408,
525

[56] References Cited

U.S. PATENT DOCUMENTS 3,773,886 11/1973 Starr et al. .
4,126,719 11/1978 Koyanagi et al. ................ 428/15
4,179,760 12/1979 Nakagawa .......................... 428/15
4,209,486 6/1980 Ross ................................... 428/15
4,219,598 8/1980 Noma et al. ..................... 428/161
4,490,410 12/1984 Takiyama et al. ................. 427/44
4,643,921 2/1987 Terabe et al. ..................... 428/15

FOREIGN PATENT DOCUMENTS 49-27100 7/1974 Japan ................................. 428/15

Primary Examiner—Ellis P. Robinson
Assistant Examiner—P. J. Ryan
Attorney, Agent, or Firm—Finnegan, Henderson, Farabow, Garrett & Dunner

[57] ABSTRACT

Artificial marble is produced by laminating a plurality of prepreg sheets formed by impregnating a porous substrate with a melamine resin composition which is composed of melamine resin and a modifier. The melamine resin is an unmodified melamine resin or an alcohol-etherified melamine resin in which formaldehyde-to-melamine molar ratio is between 1.2 to 3.0. The modifier is selected from alcohol, glycol, acrylic monomer, acrylic oligomer and vinyl acetate monomer. The artificial marble has a good stability in dimensions and it is suitable to apply the artificial marble to a composite panel or a decorative laminate panel which is free from tearing even after long time use.

7 Claims, 2 Drawing Sheets

ARTIFICIAL MARBLE

BACKGROUND OF THE INVENTION

The present invention relates to melamine resin-based artificial marble. Artificial marble is not new. The one used as the working top in a kitchen is molded from a thermoplastic resin incorporated with an inorganic filler. This type of artificial marble has several drawbacks. It is subject to heat distortion and dimensional change. It is easily stained. It lacks strength and flexibility. On the other hand, artificial marble based on a thermosetting resin also has some disadvantages. It is so hard that it is susceptible to chipping and poor in fabricability. It warps and shrinks due to a great dimensional change. It is not available in continuous form.

DESCRIPTION OF THE INVENTION

The object of the present invention is to eliminate the disadvantages involved in conventional artificial marble. The gist of the present invention resides in artificial marble which comprises a plurality of prepregnated sheets formed by impregnating a porous substrate with a melamine resin composition, said prepregnated sheets being laminated one on top of the other. The artificial marble of the present invention is characterized by its dimensional change (as measured according to JIS K6902—this test method will be described later—) being smaller than 0.5% in both the lateral and longitudinal directions.

The melamine resin composition used for impregnation in this invention is composed of a melamine resin, a modifying agent, and a filler which is optionally added.

The melamine resin used for the melamine resin composition is a melamine-formaldehyde resin or etherified melamine formaldehyde resin. It should have a formaldehyde-to-melamine molar ratio (F/M) of 1.2 to 3.0, preferably 1.5 to 2.5. With an F/M molar ratio smaller than 1.2, the melamine resin in poor in shelf life and the moldings of the melamine resin are poor in water resistance. With an F/M molar ratio greater than 3.0, the moldings of the melamine resin are susceptible to chipping during a cutting operation. For the improvement of crack resistance and fabricability for bending, the melamine resin may contain p-toluenesulfonamide, lactam, benzoguanamine resin, or methyl glucoside.

The above-mentioned modifying agent is a water- or alcohol-soluble compound miscible with the melamine resin. It is a low-molecular weight compound having a molecular weight of about 100 to 2000. Examples of the modifying agent include alcohols, glycols, and amines. Additional examples include acrylic monomers such as (methylol-)acrylamide monomer, acrylic oligomer, and vinyl acetate monomer which are added together with the reaction initiator. Preferred modifying agents are those which react with themselves or react with the melamine resin during hot molding.

The modifying agent is used in an amount of 5 to 50%, preferably 5 to 30%, based on the amount of the melamine resin. With an amount less than 5%, the modifying agent does not improve the dimensional stability and other characteristic properties of the melamine resin. With an amount more than 50%, the modifying agent aggravates the performance of the molded product and deteriorates the surface finish of the molded product due to poor and inhomogeneous miscibility with the melamine resin.

The melamine resin composition may be incorporated with a variety of fillers to impart desired characteristic properties. Examples of the fillers include silicon dioxide to improve whiteness, aluminum hydroxide to improve clearness, and aluminum dioxide to improve wear resistance.

The porous substrate may be paper made of α-cellulose fiber or linter fiber. The cellulose fiber may be incorporated with 1 to 50 wt %, preferably 5 to 30 wt %, of glass fiber, carbon fiber, polyester fiber, nylon fiber, or the like as reinforcing fiber. The reinforcing fiber improves the crack resistance and warpage resistance of the molded product. Reinforcing fiber in excess of 50 wt % will greatly reduce the strength of the substrate because of poor formation. Among the reinforcing fibers, glass fiber has a beneficial effect on the remarkable improvement of crack resistance. The porous substrate may also be incorporated or coated with a variety of additives or agents to impart an opacifying effect, flame retardance, or clarity. The amount of resin composition based on the substrate should be 60 to 200%. With an amount less than 60%, whitening or thin spots occur due to incomplete resin filling. With an amount more than 200%, the resin oozes out excessively during the molding operation. When a printed layer is put over a substrate of the mixed paper or when another surface layer is laminated over the printed layer, the porous substrate of those α-cellulose paper, linter paper, the reinforced paper mixed with the reinforcing fiber or synthetic fiber paper utilizing rayon, polyester or vinylon weighing less than 100 g/m$^2$ are used for assuring clarity and printing quality after forming.

The melamine resin composition modified as mentioned above is responsible for the reduced dimensional change of artificial marble. The shrinkage or expansion of the artificial marble of the present invention is less than 0.5% (in both the lateral and longitudinal directions) measured according to JIS K6902. Artificial marble having a dimensional change greater than 0.5% cannot be used in the form of continuous lengths, because it will crack or turn up at its ends when bonded to a base material such as plywood.

After impregnation with said melamine resin composition, the porous substrates are laminated one on top of another as many sheets as required for the desired thickness of the artificial marble. The lamination is followed by molding. The molding is accomplished by means of a high-pressure press or continuous press under the same conditions as used for melamine decorative laminates. After molding, there is provided artificial marble in the form of board. If a printed or colored substrate is placed on the second or lower layers of the laminate, it will give the artificial marble a translucent colored or patterned appearance.

The artificial marble of the present invention is superior to the conventional one in dimensional stability, strength, heat distortion temperature, stain resistance, and wear resistance. The former having a thickness of 3 mm is comparable to the latter having a thickness of 6 mm when they are used for the counter. This leads to a great saving of product weight and cost. Owing to its high strength, the artificial marble of the invention can be partly thinned (1 to 2 mm) for bending. This is impossible with the conventional one lacking strength.

Owing to its extremely good dimensional stability, the artificial marble of tee present invention does not crack when bonded to a base material of continuous lengths such as plywood. This is a great improvement over the conventional laminate composed of melamine resin alone, which is subject to cracking due to its excessive hardness and high dimensional change (1.0 to 1.2%). And yet it has melamine resin's characteristic properties such as water resistance, heat resistance, wear resistance, and stain resistance. Thus it will find use in a broad application area.

BRIEF EXPLANATION OF THE DRAWINGS

The following is a brief description of the drawings.

DETAILED DESCRIPTION OF THE EMBODIMENT

Figure 1:
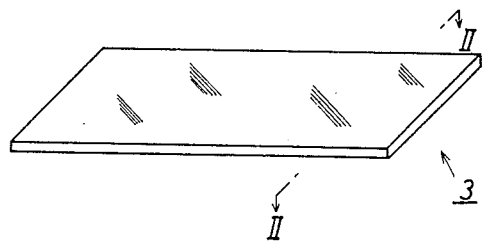
FIG. 1 is a perspective view of a composite panel made up of a plurality of the artificial marble sheets of the present invention bonded to a core board.

The invention is now described in more detail with reference to the following examples and comparative examples. (In the examples, quantities are expressed in parts by weight.)

Example 1 and Comparative Examples 1 and 2

A melamine resin composition was prepared from 100 parts of methoxy melamine resin (molar ratio: 1.50, etherification: 30%), 10 parts of acrylamide monomer, 20 parts of vinyl acetate monomer, and 0.5 parts of hydrogen peroxide (initiator). A prepreg was prepared by impregnating a porous substrate (125 g/m$^2$) composed of 20 wt % of glass fiber and 80 wt % of $\alpha$-cellulose fiber with said melamine resin composition. The amount of impregnation was 100 wt %. Twelve pieces of the prepreg sheets were laminated on top of another, followed by compression with heating. Thus there was obtained artificial marble in Example 1.

In Comparative Example 1, the same procedure as in Example 1 was repeated except that the impregnation was conducted with 80 wt % of the methoxy melamine resin only. In comparative Example 2, artificial marble (6 mm thick) was prepared from 100 parts of polymethyl methacrylate resin and 200 parts of aluminum hydroxide.

The thus prepared samples of artificial marble were evaluated according to the test methods mentioned later. The results are shown in Table 1.

TABLE 1

| No. | Test Items | Example 1 | Comparative Example 1 | Comparative Example 2 | Test Method |
|---|---|---|---|---|---|
| 1 | (Longitudinal) | | | | (1) |
|  | Shrinkage (%) | 0.15 | 0.50 | — | |
|  | Expansion (%) | 0.25 | 0.40 | — | |
|  | (Lateral) | | | | |
|  | Shrinkage (%) | 0.20 | 1.0 | — | |
|  | Expansion (%) | 0.35 | 0.5 | — | |
| 2 | Crack test | Passed 5 cycles | Cracked 3 cycles | — | (2) |
| 3 | Flexural strength (kg/mm$^2$) | 12 | 10 | 5 | (3) |
| 4 | Oil pan test (180° C.) | 0 | 0 | Trace left | (4) |
|  | (230° C.) | 0 | 0 | Trace left | |
| 5 | Solvent resistance | | | | (5) |
|  | (Acetone) | 0 | 0 | Gloss lost | |
|  | (Toluene) | 0 | 0 | Gloss lost | |
| 6 | Wear resistance (g/100 cycles) | 0.04 | 0.04 | 0.08 | (6) |
| 7 | Impact resistance (cm) | 140 | 100 | 70 | (7) |

Test Method (1) Dimensional change (JIS K6902)

Test pieces measuring about 140 mm long and about 13 mm wide (three each in the longitudinal direction and lateral direction) are cut out of the samples. After the accurate measurement of the length (l$_1$ mm) with a micrometer, the test piece is allowed to stand in a constant temperature bath at 70° C. for 24 hours (for low humidity treatment). The length (l$_2$ mm) of the treated test piece is accurately measured again. On the other hand, after the accurate measurement of the length (l$_3$ mm), the test piece is allowed to stand in a constant temperature bath at 40±2 ° C. and 90-95%RH for 96 hours (for high humidity treatment). The length (l$_4$ mm) of the treated test piece is accurately measured again. The shrinkage (a) and expansion (b) are calculated from l$_1$, l$_2$, l$_3$, and l$_4$ according to the following formulas.

$$a = \frac{l_1 - l_2}{l_1} \times 100$$

$$b = \frac{l_4 - l_3}{l_3} \times 100$$

(2) Crack test

A test piece measuring 600 mm by 300 mm is bonded to a 21 mm thick plywood of the same size. A 30 mm long cut is made at the center of the 600 mm side. The bonded test pieces is allowed to stand in a constant temperature bath at 50° C. for 24 hours and then in a constant temperature bath at −20° C. for 24 hours. This procedure (one cycle) is repeated until cracking occurs at the cut.

(3) Flexural strength (JIS K6911)

A test piece is placed on two supports and a load is applied to the center of the test piece until breakage. The flexural strength ($\sigma$) is calculated from the load at breakage according to the following equation.

$$\sigma = \frac{3PL_y}{2Wh^2}$$

where P: load (kgf), L$_y$: support span (mm), W: width of test piece (mm), h: thickness of test piece (mm).

(4) Oil pan test (JIS K6902)

Oil pans each heated to 180° C. and 230° C. are placed on the sample for 20 minutes, and the surface of the sample is checked for any anomaly.

(5) Solvent resistance

The surface of the sample is checked for any anomaly after wiping 50 times with a cloth moistened with a solvent.

(6) Wear resistance (JIS K6902)

The sample is rubbed with turning abrasive paper bonded to a rubber ring, 12.7 mm wide and 50.6 mm in outside diameter. After 1000 turns, the amount of wear is measured, and the amount of wear per 100 turns is reported.

(7) Impact resistance

A test piece measuring 60 cm by 60 cm is placed on two square bars (10 cm square and 60 cm long) 40 cm apart (inside), and a steel ball weighing 321 g is dropped. The maximum falling distance at which cracking does not occur is measured.

The following is an explanation of the application of the artificial marble of the invention to form composite panels.

Figure 2:
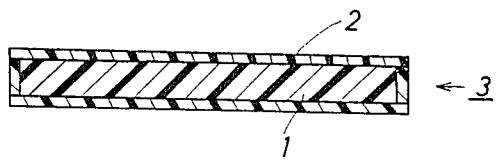
FIG. 2 is a sectional view taken along the line II—II of FIG. 1.
Figure 3:
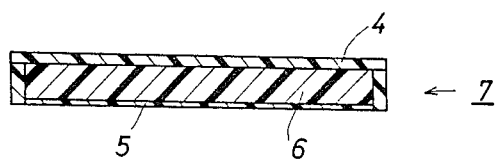
FIGS. 3-7 are sectional views of various configurations of a composite panel.
Figure 4:
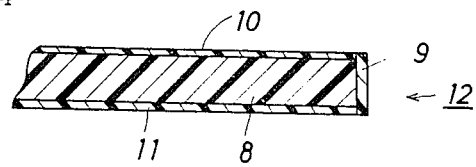
Figure 5:
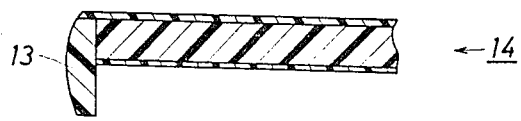
Figure 6:
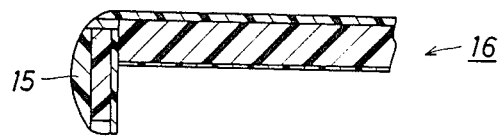
Figure 7:

With reference to FIGS. 1 and 2, the composite panel 3 is formed by bonding the artificial marble sheet 2 of the invention to the upper and lower surfaces, butt ends, and sides of the core 1 (12 mm thick). The core may be a wood-based board (including plywood, particle board, and hard board), a composite board containing a honeycomb structure or foam inside, or an inorganic board (including asbestos slate board).

The bonding of the artificial marble to the core and the bonding of the artificial marble to each other at the corners should be accomplished with an adhesive having no color or the same color as the artificial marble so that the adhesive is invisible through the translucent artificial marble. The thus finished board will look like a single uniform board.

The composite panel constructed as mentioned above is very durable for a long period of use because it is integrally formed by covering a core with the artificial marble having superior dimensional stability, surface properties, and impact resistance. It is not subject to surface cracking and corner separation. Therefore, it will find use as working top, washstand, counter, dining table, and the like which often get wet.

The artificial marble of the invention has excellent impact resistance owing to its structure formed by laminating resin-impregnated porous substrates. In addition, the artificial marble of the invention may be given a pattern characteristic of natural marble if the porous substrate is properly printed or colored. This is an improvement over the conventional artificial marble.

An additional advantage of the artificial marble is that it is light and can be easily worked by sawing and drilling if a wood-based material like plywood is used as the core. Moreover, it can be easily attached to a cabinet and the like because it firmly retains nails and screws.

The artificial marble of the present invention is used as a component of decorative laminate in the following manner. For the purpose of decoration, the decorative laminate is provided with a printed or colored decorative layer which is impregnated with the same resin as used for the impregnation of the substrate. This decorative layer is arranged as the top layer or as the second or lower layer. In the former case, the decorative layer should be placed with the printed or colored side inward for the purpose of protection. Two or more decorative layers may be arranged on top of another, with the printed pattern of each layer aligned or staggered vertically.

The decorative laminate constructed as mentioned above changes in color and dimensions very little. Its light resistance $\Delta E$ is smaller than 1.5 when measured according to JIS K6902, and its dimensional change is smaller than 0.5%.

Example and Comparative Example

A melamine resin composition was prepared from 100 parts of methoxy melamine resin (F/M molar ratio: 1.50, etherification: 20%), 20 parts of methylolacrylamide monomer, 0.5 parts of hydrogen peroxide (initiator), and melamine resin hardener. Prepreg was prepared by impregnating a substrate (125 g/m$^2$) composed of 20 wt % of glass fiber and 80 wt % of $\alpha$-cellulose fiber with said melamine resin composition. The amount of impregnation was 100 wt %. Twelve pieces of the prepreg were laminated on top of another, followed by compression with heating. Thus there was obtained artificial marble in Example.

In Comparative Example, the same procedure as in Example was repeated except that the substrate was replaced by $\alpha$-cellulose paper having a basis weight of 125 g/m$^2$ and the impregnation is conducted with only the methoxy melamine resin. The amount of impregnation was 100 wt %. The thus prepared samples of artificial marble were evaluated according to JIS K6902 mentioned later and other test methods mentioned earlier. The results are shown in Table 2.

TABLE 2

| No. | Test Items | Example | Comparative Example | Test Methods |
|---|---|---|---|---|
| 1 | Light resistance $\Delta E$ | 1.0 | 2.8 | JIS K6902 |
| 2 | Dimensional change | | | JIS K6902 |
| | (Longitudinal) | | | |
| | Shrinkage (%) | 0.14 | 0.50 | |
| | Expansion (%) | 0.23 | 0.40 | |
| | (Lateral) | | | |
| | Shrinkage (%) | 0.20 | 1.0 | |
| | Expansion (%) | 0.33 | 0.5 | |
| 3 | Crack test | 5 cycles | 3 cycles | Mentioned early |

The test method for light resistance (JIS K6902 and JIS K7102) is designed to measure the color fastness of colored plastic materials to the light of a carbon arc lamp. According to the test method, the specimen is exposed to the specified light using a UV light carbon fadeometer or UV light carbon weatherometer for a time period corresponding to 48 hours for the standard fading adjusted with luminous intensity test paper. The color difference observed after exposure is expressed in terms of Lab color space according to JIS K7102.

Figure 8:
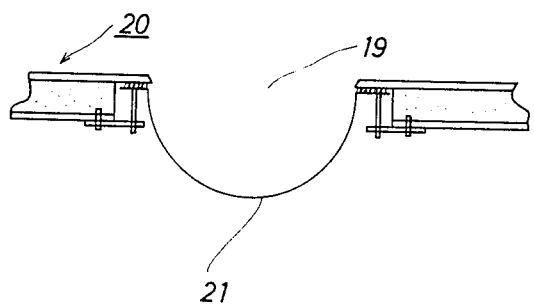
FIG. 8 is a sectional view of a sink in combination with a composite panel.

The decorative laminate in the present invention is by far superior in light resistance, dimensional stability, and crack resistance to the conventional melamine resin-based laminate board. In addition, it has good stain resistance, wear resistance, and heat resistance. Because of these outstanding properties, it will find use in building, furniture, etc. Some examples of decorative laminates utilizing the artificial marble plate are shown in FIGS. 3, 4, 5, 6 and 7. In those drawings, numerals 7, 12, 14, 16 and 18 denote the composite panels (decorative laminates) of various structures in which numerals 6 and 8 denote a core plate and numerals 4, 5, 9, 10, 11, 13, 15 and 17 denotes the artificial marble according to the invention. FIG. 8 shows a structure of a sink unit using the decorative laminate 20. At the edge of the opening 19 of the decorative laminate, a tub 21 is attached with the upper plate of the artificial marble overhanging to the circumference of the tub 21.

The decorative laminate of the invention solved problems such as discoloration and cracking involved in the conventional laminated board. (The conventional laminated board was subject to cracking when bonded to a substrate such as plywood to make a continuous length.) It provides a good external appearance even on the cut ends such as corners because it has a uniform color tone across the entire layers. It provides a vivid pattern on the white background and it retains the vivid pattern for a long time owing to its outstanding light resistance even though the pattern is printed in light color.

What is claimed is:

1. Artificial marble which comprises a molded sheet of a plurality of a porous, fibrous substrates impregnated with a melamine resin composition and laminated one on top of the other, said melamine resin composition comprising a melamine resin selected from the group consisting of a melamine-formaldehyde resin and an alcohol-etherified melamine-formaldehyde resin, said melamine resin having a formaldehyde to melamine ratio of from 1.2 to 3.0 and a modifier for the resin an amount of from 5 to 50% by weight based on the weight of the resin, said modifier being selected from the group consisting of alcohol, glycol, acrylic monomer, acrylic oligomer, and vinyl acetate monomer or mixtures thereof, said melamine resin composition being present in an amount of from 60 to 200% by weight based on the weight of the substrates.

2. The artificial marble of claim 1, wherein the melamine resin contains a filler.

3. The artificial marble of claim 2, wherein the filler is selected from the group consisting of silicon dioxide, aluminum hydroxide, and aluminum dioxide or mixtures thereof.

4. The artificial marble of claim 1, wherein the porous substrate is of α-cellulose fiber of linter fiber.

5. The artificial marble of claim 4, wherein the porous substrates also contain reinforcing fiber selected from the group consisting of glass fiber, carbon fiber, polyester fiber, and nylon fiber or mixtures thereof, said fiber being present in an amount of from 1 to 50% by weight based on the weight of a porous substrate.

6. The artificial marble of claim 1, which includes a sheet bearing a printed pattern laminated between the impregnated substrates.

7. An artificial marble article which comprises a core and a sheet of the artificial marble of claim 1 bonded with an adhesive to all surfaces of the core.

* * * * *

UNITED STATES PATENT AND TRADEMARK OFFICE
CERTIFICATE OF CORRECTION

PATENT NO. : 4,871,596
DATED : October 3, 1989
INVENTOR(S) : Takashi KAMIYA et al.

It is certified that error appears in the above-identified patent and that said Letters Patent is hereby corrected as shown below:

Claim 1, column 7, line 24, after "resin" insert --in--; and

Claim 4, column 8, line 13, change "of" (second occurrence) to --or--.

Signed and Sealed this

Seventh Day of January, 1992

Attest:

HARRY F. MANBECK, JR.

Attesting Officer

Commissioner of Patents and Trademarks